(12) United States Patent
Kudo et al.

(10) Patent No.: US 6,183,895 B1
(45) Date of Patent: Feb. 6, 2001

(54) FUEL-CELL POWER GENERATING SYSTEM

(75) Inventors: Hitoshi Kudo; Noriyuki Yamaga, both of Hirakata; Mikio Shinagawa, Neyagawa; Junji Adachi, Osaka; Yoshinori Tokunaga, Toyonaka; Toru Nakamura, Kadoma; Noboru Hashimoto, Suita; Manabu Mizobuchi, Kobe; Kensaku Kinugawa, Shijonawate, all of (JP)

(73) Assignee: Matsushita Electric Works, Ltd., Osaka (JP)

( * ) Notice: Under 35 U.S.C. 154(b), the term of this patent shall be extended for 0 days.

(21) Appl. No.: 09/147,439

(22) PCT Filed: Jul. 2, 1997

(86) PCT No.: PCT/JP97/02288

§ 371 Date: Dec. 23, 1998

§ 102(e) Date: Dec. 23, 1998

(87) PCT Pub. No.: WO98/00878

PCT Pub. Date: Aug. 1, 1998

(30) Foreign Application Priority Data

Jul. 2, 1996 (JP) .................................................. 8-172246
Jul. 15, 1996 (JP) .................................................. 8-184353

(51) Int. Cl.$^7$ .................................................. H01M 8/06
(52) U.S. Cl. .................................................. 429/20; 429/22
(58) Field of Search .................................................. 429/9, 20, 22

(56) References Cited

U.S. PATENT DOCUMENTS

| | | | |
|---|---|---|---|
| 4,046,956 | * 9/1977 | Fanciullo | 429/20 |
| 5,149,600 | * 9/1992 | Yamase et al. | 429/20 X |
| 5,334,463 | * 8/1994 | Tajima et al. | 429/9 |
| 5,897,970 | * 4/1999 | Isomura et al. | 429/20 X |
| 5,985,474 | * 11/1999 | Chen et al. | 429/22 X |

FOREIGN PATENT DOCUMENTS

| | | |
|---|---|---|
| 5190196 | 7/1993 | (JP) . |
| 5-201702 | * 8/1993 | (JP) . |
| 5-234611 | * 9/1993 | (JP) . |
| 5-260612 | * 10/1993 | (JP) . |
| 6-015172 | * 1/1994 | (JP) . |
| 6-150955 | * 5/1994 | (JP) . |
| 6-219704 | * 8/1994 | (JP) . |
| 6310166 | 11/1994 | (JP) . |
| 7-315801 | * 12/1995 | (JP) . |
| 98/00361 | 1/1998 | (WO) . |

OTHER PUBLICATIONS

An English language abstract of JP 7–315801, Dec. 1995.
An English Language abstract of JP 5–260612, Oct. 1993.
An English Language abstract of JP 6–150955, May 1994.
An English Language abstract of JP 6–015172, Jan. 1999.
An English Language abstract of JP 6–219704, Aug. 1994.
An English Language abstract of JP 5–201702, Aug. 1993.
An English Language abstract of JP5–234611, Sep. 1993.
An English Language abstract of JP 5–190196, Jul. 1993.
An English Language abstract of JP 6–310166, Nov. 1994.

* cited by examiner

*Primary Examiner*—Stephen Kalafut
(74) *Attorney, Agent, or Firm*—Greenblum & Bernstein, P.L.C.

(57) ABSTRACT

A portable power generating system can be operated by using a portable pressure canister containing a liquefied butane fuel gas. In the power generating system, a part of the butane gas contained in the pressure canister is used as a fuel gas and reminder of the butane gas is used to prepare a reformed gas containing hydrogen gas by reaction with water. The hydrogen gas in the reformed gas and oxygen gas in air are used in a fuel cell to generate electric power. The power generating system is characterized in a compact portable one which further comprises a device for regulating the amount of the butane gas discharged from said pressure canister and a device for controlling a flow rate of the butane gas, installed in feed lines of supplying the butane gas from said pressure canister to said reforming device.

19 Claims, 12 Drawing Sheets

FUEL-CELL POWER GENERATING SYSTEM

TECHNICAL FILED

The present invention relates to a portable type fuel cell power generating system and, more particularly, to a portable type fuel cell power generating system capable of utilizing a commercially available butane gas cassette or pressure canister.

BACKGROUND ART

A fuel cell is known as a power generation system having a high energy efficiency, which generates electric power through electrochemical reaction of mainly hydrogen and oxygen, or hydrogen-rich gas obtained by reforming natural gas or the like and air, which are introduced to a fuel electrode and an oxygen electrode, respectively. Therefore, there has been proposed a portable type power generating system utilizing the fuel cell have been proposed.

Japanese Patent Kokai Publication No. 5-190196 proposes a portable power source wherein hydrogen-oxygen fuel cell is operated by using hydrogen absorbed in a hydrogen storage alloy in a pressure canister. This portable power source has such problems as the hydrogen storage alloy container is too expensive to be widely used, and the container is too heavy to be used in a portable power source.

Japanese Patent Kokai Publication No. 6-310166 also proposes a portable fuel cell power source comprising a fuel pressure canister filled with aqueous solution of methanol at a high pressure instead of hydrogen, a fuel reforming device which modifies the aqueous solution of methanol discharged from the fuel pressure canister into a gas consisting mainly of hydrogen, a fuel cell which generates electricity by using the hydrogen-rich gas as the fuel, and a cabinet that houses these components. This power source has such a problem that the fuel pressure container which contains the aqueous solution of methanol at a high pressure must have a high withstand pressure while such a pressure container is not suited to a portable apparatus and is not commercially available, resulting in an inconvenience for wide commercial applications.

For these reasons, portable power generation systems commercialized at present are still based on a gasoline engine, although it is a problem that small gasoline engine power generation systems of output power within several hundreds of watts have energy efficiency as low as 10% or less.

SUMMARY OF THE INVENTION

Therefore, there has been required to provide a portable fuel cell using a fuel cell of high energy efficiency and a commercially available portable butane gas pressure canister as the fuel source. But many problems must be solved before such an apparatus is realized.

(1) The temperature of a steam reforming process should be changed depending on kinds of gas to be steam-reformed in that the butane gas is preferably reformed at a high temperature not lower than 600° C., far higher than in the case of reforming methanol (220 to 270° C.). Although a method of reforming natural gases or hydrocarbon fuels may be applied, the method of reforming natural gas in a large plant cannot be applied as it is, so that it is particularly difficult to provide a small reforming device suitable for a portable apparatus.

(2) The butane gas pressure canister is subject to the influence of the ambient temperature, so that it is difficult to supply a predetermined amount of the butane gas to the reforming device in accordance to the load or to supply a predetermined amount of reformed gas to the fuel cell, thereby to generate a required amount of electric power.

(3) A solid polymer type fuel cell is more preferable than a phosphoric acid type fuel cell for the portable fuel cell. However, the solid polymer type fuel cell requires a decreased CO concentration of several tens ppm. in the reformed gas, which makes it a problem to strictly control the reforming device, particularly the CO oxidation section.

Therefore, it is a main object of the present invention to solve the above problems and to provide a portable fuel cell power generating system which uses a widely used butane gas pressure canister and has high energy efficiency.

The present invention has been completed on the basis of the invention "reforming device" filed separately (PCT/JP97/02265; Jun. 30, 1997), and provides a portable fuel cell power generating system, comprising:

a portable butane gas pressure canister containing a liquefied butane gas as the fuel;

a portable reforming device which generates a reformed gas including hydrogen gas by using a part of the butane gas supplied from the pressure canister as the fuel gas and causing a steam reforming reaction of the rest of the butane gas and water;

a portable fuel cell which generates electric power from the hydrogen gas included in the reformed gas and an oxygen gas included in the air;

a means for controlling the amount of the butane gas evaporated from the butane gas pressure canister; and a butane gas flow control means installed in a flow path of supplying the butane gas from the butane gas pressure canister to the reforming device.

According to the present invention, as shown in the system operation diagram of FIG. 9, the butane gas from the portable pressure canister and water vapor are processed in the reforming device where the reformed gas consisting mainly of hydrogen is generated through steam reforming reaction of the butane gas, then hydrogen and oxygen are caused to react in the fuel cell to generate direct current, which may be converted to alternating current by an inverter and supplied to a load. According to the present invention, high energy efficiency of not less than 20% can be achieved even with a small power generation system having output power of several hundreds of watts. The energy efficiency is about three times as large as that of a gasoline engine power generator.

In a preferred embodiment of the present invention, a flow path from the butane gas pressure canister to the reforming device may comprise a passage for supplying the butane gas to be reformed and a passage for supplying the butane gas as the fuel used in the reforming device, so that a part of the butane gas is used as the fuel to heat the rest of the butane gas for reforming, thereby achieving a high reforming temperature.

In another preferred embodiment of the power generation system according to the present invention, continuous operation is enabled by providing two or more butane gas pressure canisters so that the gas can be supplied without interrupt when changing a pressure canister.

The butane gas pressure canister is provided with a means for controlling the amount of the butane gas evaporated. The butane gas therefrom can be evaporated by decreasing the pressure and/or heating. When the butane gas pressure canister is to be heated, the pressure canister is heated either directly or indirectly, with the heating means being selected from the group consisting of an electric heater, a means utilizing waste heat from the fuel cell and a means utilizing waste heat from the reforming device. Thus, it is made possible to control the pressure canister temperature and consequently the amount of the butane gas evaporated.

It is difficult to maintain the required amount of gas flow rate simply by controlling the amount of the butane gas evaporated. Therefore, it is preferable to provide the butane gas flow control means comprising a pressure regulator and a flow control valve.

The butane gas supplied from the butane gas pressure canister includes sulfur which is likely to cause degradation of a catalyst used in the reforming device and is therefore preferably removed. Thus, a desulfurizer is installed in the flow path through which the butane gas to be reformed is supplied in the preferred embodiment of the present invention. In order to increase the efficiency of desulfurization, it is preferable that the sulfur content be transformed to hydrogen sulfide which is then adsorbed in the desulfurizer. Accordingly, the desulfurizer is provided with a hydrogenation catalyst section for adding hydrogen to the butane gas to be reformed in the preferred embodiment of the present invention.

In the steam reforming reaction of the butane gas, a mixture of water vapor and butane gas is reacted at a temperature of not less than 600° C. by using a catalyst of nickel, ruthenium or the like. While a nickel-based catalyst causes deterioration under such a condition that the value of S/C is not more than 2, ruthenium-based catalyst does not causes deterioration under the condition that S/C is not more than 2.

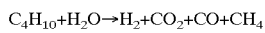

The reforming reaction section is preferably operated at a temperature of not less than 600° C. with the value of S/C being not less than 2.5, more preferably about 3. This is because the catalyst can be used under longer period under this condition, although the energy efficiency is slightly lower than in the case that S/C is not more than 2.5 (operating condition of a large plant where natural gas is reformed with steam). (see FIG. 10.)

Then carbon monoxide and water vapor are reacted in a shift catalyst section comprising a copper-zinc catalyst at a temperature from about 220 to 280° C.

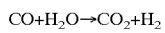

It is usually aimed to make the carbon monoxide concentration not higher than 1%.

Carbon monoxide concentration is reduced by selective oxidation of carbon monoxide in a selective oxidation catalyst section comprising platinum or ruthenium catalyst. Target value of carbon monoxide concentration is usually set to 50 ppm or lower. While platinum catalyst requires it to control the reaction temperature very rigorously, ruthenium catalyst is capable of selective oxidation of carbon monoxide in a relatively broad range of temperatures from about 120 to 180° C. and is therefore more preferable.

While the reforming device must be small enough to be portable, efficient steam reforming requires it to exactly control the temperature and therefore it is preferable that the reforming device comprises the reforming reaction section, shift reaction section and CO oxidation section which are formed separately and then integrated into one unit. Various forms of reforming device are described in detail in the separate application (refer to PCT/JP97/02265; Jun. 30, 1997).

$Ru/Al_2O_3$ or $Ru/ZrO_2$ catalyst used in the reforming reaction section can be produced by immersing a carrier in ruthenium chloride solution, thereby to impregnate the carrier with ruthenium chloride, which is dried and then reduced by using hydrazine or hydrogen gas as a reducing agent, followed by rinsing with water and drying. These catalysts have higher performance of catalyzing reforming reaction than $Ni/Al_2O_3$ catalyst (refer to FIG. 11).

The CO oxidation section is preferably operated with a stoichiometrical ratio (ratio of a theoretical amount of air for oxidation CO in a reformed gas to an amount of air used) in a range from 3 to 10, for higher efficiency of CO oxidation (see FIG. 12). When the ratio is lower than 3, oxygen is consumed in the oxidation of hydrogen and CO concentration cannot be decreased. The CO oxidation section is preferably provided with a $Ru/Al_2O_3$ catalyst and operated at a temperature from 120 to 180° C., because of easier control with broader range of oxidizing temperatures than platinum-based catalysts.

It is preferable to recover the water content included in the reformed gas from the reforming device, the water content included in the reformed gas discharged from the fuel cell and in the exhaust air and/or water content included in the combustion gas, and use the recovered water in reforming. In this case, it is desirable to install a filter for filtering the recycled water, an ion exchanger for purifying the water and a water tank to store the water.

While an electric circuit is provided for giving electric output of the fuel cell to the load via an inverter and a converter, in order to provide stable output without fluctuation independent of the load, it is desirable to install a secondary battery connected via a regulator in the electric circuit. The secondary battery can be used as a starting power source and accommodates sharp variations in the load.

BEST MODE FOR CARRYING OUT THE PREFERRED EMBODIMENTS

The present invention will now be described in detail below.

Figure 1:
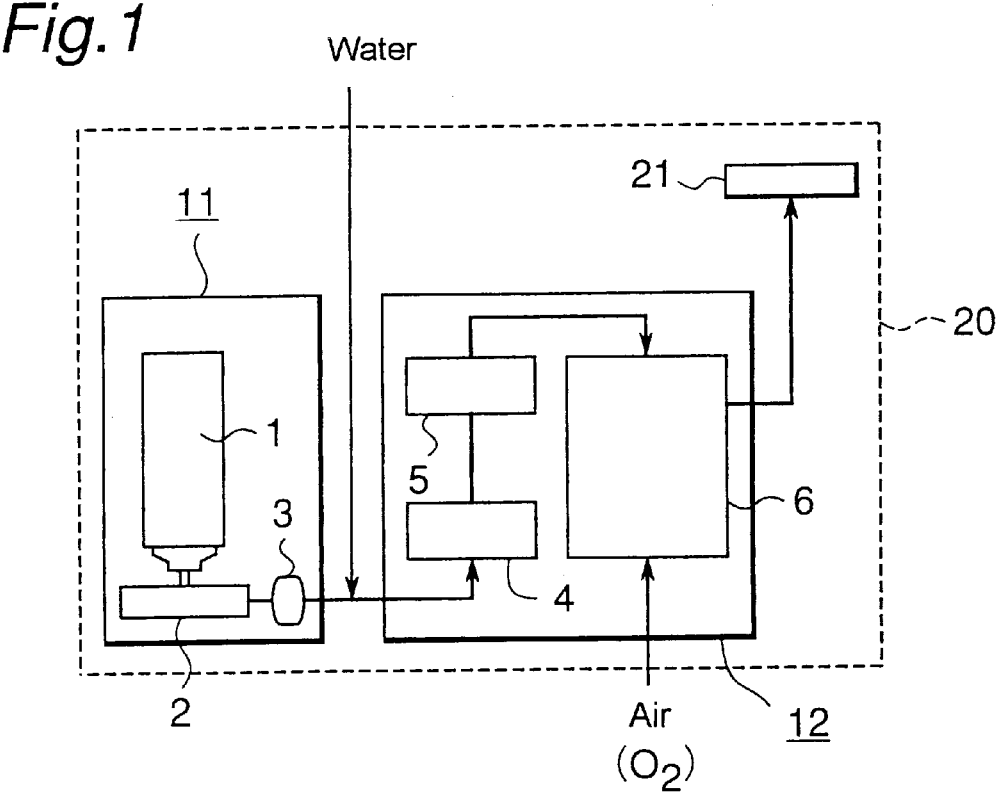
FIG. 1 is a schematic diagram showing the construction of the fuel cell power generating system according to the first embodiment of the present invention.

The first embodiment of the fuel cell power generating system will be described below with reference to the accompanying drawings. FIG. 1 is a schematic diagram showing the construction of the fuel cell power generating system according to the first embodiment of the present invention. The fuel cell power generating system comprises a fuel supplying device 11 for supplying the butane gas to a fuel cell 12 and the fuel cell 12 which generates electric power, both housed in a casing 20 as shown in FIG. 1.

According to the present invention, the butane gas is used as the raw fuel and a portable butane gas pressure canister 1 filled with butane is installed in the fuel supplying device 11 as the butane gas source. The butane gas pressure canister 1 is a small one which is easier to handle compared to those of hydrogen gas and the like. For the butane gas pressure canister 1, for example, the disposable fuel container for the portable gas cooking stove specified in JIS-S-2148 may be used. The fuel supplying device 11 is further provided with a pressure canister receiver 2 where the butane gas pressure canister 1 is attached, and an evaporator 3 which evaporates butane introduced from the butane gas pressure canister 1 by decreasing the pressure thereof. Means for controlling the amount of evaporated butane either individually or in cooperation with the evaporator 3 may be provided in the fuel supplying device, details thereof will be described later with reference to FIG. 14 and FIG. 15. The evaporator 3 gasifies butane and supplies it to a reforming device 4 that follows, although no limitation is given to the type of the evaporator, while the evaporator 3 is not necessary in case the butane gas pressure canister specified in JIS-S-2148 is mounted in a horizontal position, as will be described later.

The pressure canister receiver 2 allows it to attach and detach the butane gas pressure canister 1 easily. Thus the butane gas pressure canister 1 can be changed any number of times when it is emptied, thereby to continue the supply of a required amount of the butane gas. Installed between the evaporator 3 and the fuel cell 12 is a butane gas flow regulating means. The fuel cell 12 has the reforming device 4, a CO eliminator 5 which decreases the CO content of the gas generated in the reforming device 4 and a fuel cell 12. The reforming device 4 generates a hydrogen-rich reformed gas by causing the butane gas and water turned into steam to undergo steam reforming reaction by using a reforming catalyst. The reforming catalyst includes those prepared from a carrier which carries a metal. The metal to be carried includes ruthenium, rhodium, nickel or the like. A reforming catalyst prepared from a carrier which carries at least one metal of ruthenium or rhodium, has higher catalyzing activity than a reforming catalyst prepared from a carrier which carries a metal to be carried, such as nickel, thereby making it possible to make smaller reforming device 4, and is therefore preferred. The reforming device 4 employing the reforming catalyst loaded with ruthenium or rhodium is also capable of maintaining the function of the reforming catalyst over a longer period of time despite smaller size, and is therefore desirable. As the carrier for carrying the metal to be carried, for example, zirconia and alumina are suitable, but silica gel, active alumina, titania, cordierite, zeolite, active carbon or the like may also be used. The reformed gas generated by the reforming device 4 includes, in addition to hydrogen, a trace of carbon dioxide, methane gas and carbon monoxide (CO).

The CO eliminator 5 is connected to the reforming device 4. The CO eliminator 5 decreases the concentration of carbon monoxide in the reformed gas. In this system, because carbon monoxide acts as a catalyst poison on a platinum catalyst widely used as an electrode of the fuel cell 6, carbon monoxide must be decreased. The CO eliminator 5 may be of such a construction as a CO shifter which decreases carbon monoxide by using a catalyst and a CO oxidizer which oxidizes carbon monoxide are combined, or such a construction as the CO shifter and a methanation device which converts carbon monoxide to methane are combined. The catalyst used in the CO shifter may use iron, chromium, copper, zinc or the like as the metal to be carried and alumina as the carrier. The CO oxidation eliminator preferably operates in such as process as the reformed gas of which carbon monoxide content has been decreased in the CO shifter is mixed with oxygen or air, and is reacted with a catalyst prepared from an alumina carrier which carries platinum, ruthenium or the like as the metal to be carries, thereby further decreasing the concentration of carbon monoxide. The methanation device decreases the concentration of carbon monoxide by causing carbon monoxide and hydrogen in the reformed gas from the CO shifter to react with a catalyst prepared from an alumina carrier which carries nickel, palladium or rhodium as the metal to be carried, thus converting carbon monoxide to methane.

The reformed gas passing through the CO eliminator 5 is supplied to the fuel cell 6. Hydrogen included in the reformed gas is introduced to a fuel electrode (negative electrode) of the fuel cell 6 and oxygen in the air is introduced to an oxygen electrode (positive electrode), so that electric power is generated through electrochemical reaction between the fuel electrode (negative electrode) and the oxygen electrode (positive electrode). The fuel cell 6 may be a phosphoric acid fuel cell, solid polymer fuel cell or the like, while the solid polymer fuel cell, which has a fuel electrode where hydrogen in the reformed gas is introduced through a polymer membrane and an oxygen electrode where oxygen is introduced, is capable of operating at a temperature as low as 70 to 80° C. or lower, thus being subject to less limitation on the place of installation, and is therefore suitable for portable fuel cell.

Electric power generated by the fuel cell 6 can be outputted in the form of direct current. The fuel cell power generating system described above is provided with an inverter 21 and carries out stable conversion from direct current to direct current or from direct current to alternating current, thus providing the direct current output in a desired form suitable for the application. The inverter 21 makes it possible to provide 100 Vac output similarly to the commercial ac power, or provide 12 Vdc output. The fuel cell power generating system uses the portable butane gas pressure canister 1 which is easy to handle for the supply of fuel, and the pressure canister is attached to the pressure canister receiver 2 enabling it to supply a required amount of the butane gas, and therefore the casing which houses the system can be made compact and light in weight and can be carried easily. Also because the CO eliminator 5 is provided, high electric generation efficiency can be maintained.

Figure 2:
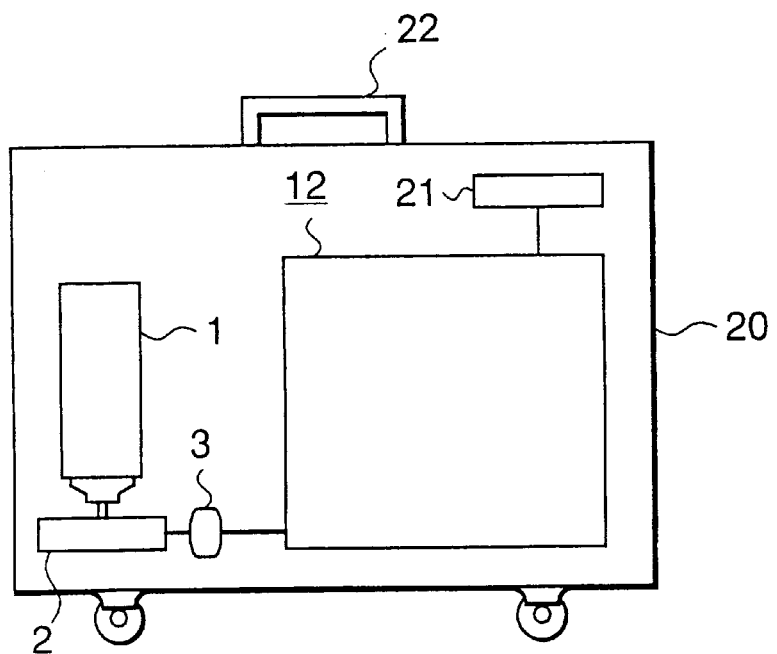
FIG. 2 is a schematic view showing the construction of the fuel cell power generating system according to the second embodiment of the present invention.

The second embodiment of the present invention is shown in FIG. 2. In order to make it possible for one person to carry the fuel supplying device 11 and the fuel cell 12, a casing 20 housing these components is provided with a handle 22, wheels 23 and a belt. These provisions, together with the compact size of the fuel cell power generating system, make it easy to carry the fuel cell power generating system.

Because the fuel cell power generating system requires electric power to start the operation, it is desirable to incorporate a battery (not shown) of such a capacity that enables the system to self-startup, in order to use the system outdoors.

Figure 3:
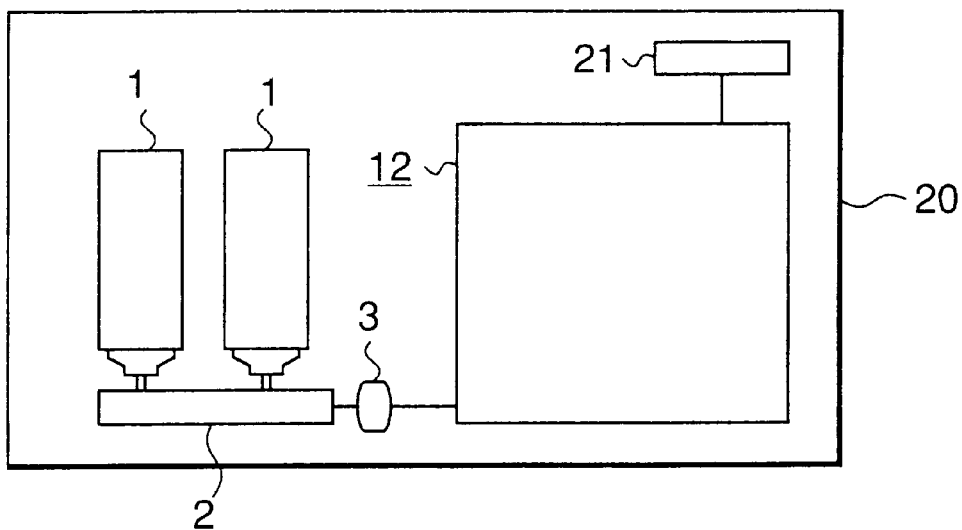
FIG. 3 is a schematic diagram showing the construction f the fuel cell power generating system according to the third embodiment of the present invention.

The third embodiment of the present invention is shown in FIG. 3. FIG. 3 is a schematic diagram showing the construction of the fuel cell power generating system according to the third embodiment of the present invention. Description that follows deals only with the difference of the third embodiment from the fuel cell power generating system described above. The fuel cell power generating system described above is provided with the pressure canister receiver 2 where two portable butane gas pressure canisters 1,1 can be mounted. When operating with only one butane gas pressure canister 1, the pressure canister must be changed when emptied during which supply of the butane gas is interrupted, resulting in an interrupt in the power generation. By providing two butane gas pressure canisters 1,1, it is made possible when changing one butane gas pressure canister 1 to supply the butane gas from the other butane gas pressure canister 1, thus generating electric power without interrupt. It is preferable that exhaustion of gas in the butane gas pressure canister 1 be warned by means of a buzzer, a lamp, or the like. Number of the butane gas pressure canisters 1 provided in the fuel cell power generating system is not limited to that of the embodiment described above, as far as it is not less than 2.

Figure 4:
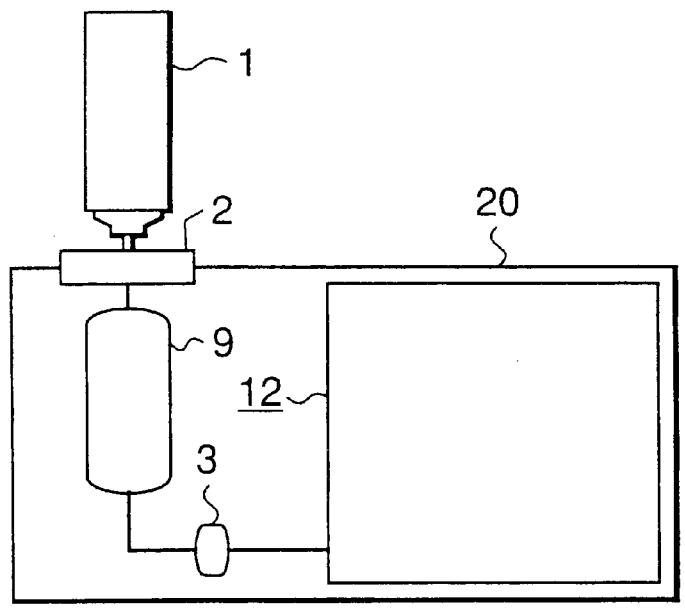
FIG. 4 is a schematic diagram showing the construction of the fuel cell power generating system according to the fourth embodiment of the present invention.

The fourth embodiment of the present invention is shown in FIG. 4. The fuel cell power generating system has a fuel tank 9 which, during normal operation, temporarily stores the butane gas supplied from the butane gas pressure canister 1 mounted on the pressure canister receiver 2. As a greater amount of the butane gas is required to start the power generation in the fuel cell, the butane gas which was stored in the fuel tank 9 during the prior operation is used in the startup. Because the butane gas is supplied from other than the butane gas pressure canister 1 during startup, the operation can be started smoothly. Also even when only one butane gas pressure canister is mounted on the pressure canister receiver 2, the butane gas can be supplied from the fuel tank 9 in the case of changing the butane gas pressure canister 1, and therefore power generation can be continued without interruption.

Figure 5:
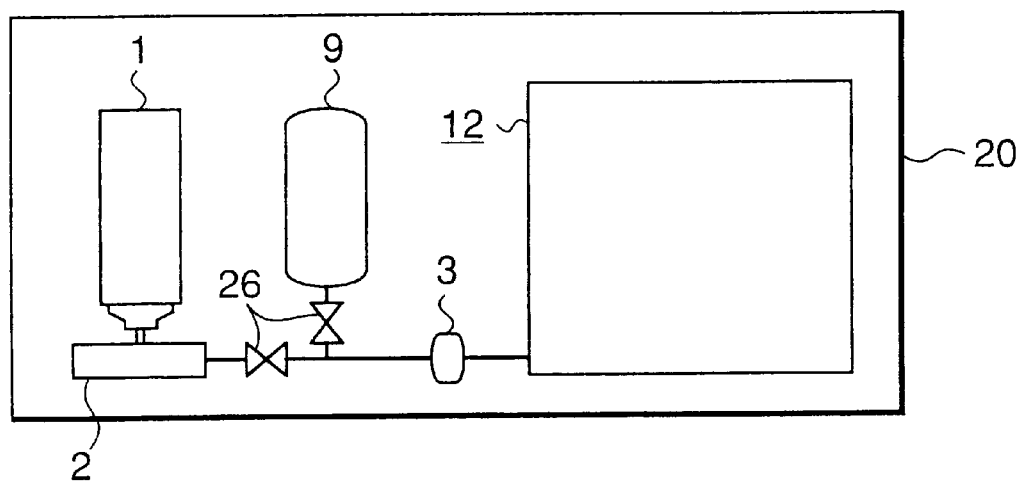
FIG. 5 is a schematic diagram showing the construction of the fuel cell power generating system according to the fifth embodiment of the present invention.

The fuel tank 9 may be either of such a construction as the entire content of the butane gas pressure canister 1 is stored in the fuel tank 9 as shown in FIG. 4, or of such a construction as the fuel tank 9 is connected to a branch line of a pipe connecting the pressure canister receiver 2 and the evaporator 3, so that only a required amount of the butane gas is stored in the fuel tank 9 by switching a cock 26 thus supplying a necessary amount of gas, as in the fifth embodiment shown in FIG. 5. As described above, the fuel cell power generating system has a function to control the amount of gas supplied to the fuel cell 12 by using the butane gas stored in the fuel tank 9, and is therefore capable of operating over a long period of time without interrupting the power generation despite the portable construction.

Figure 6:
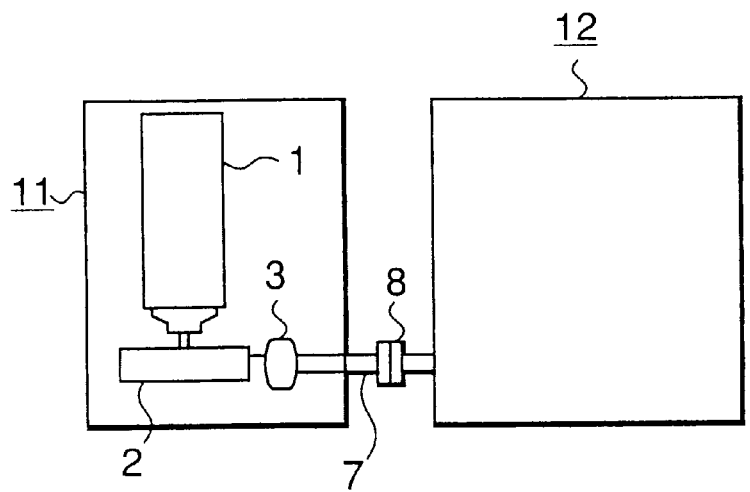
FIG. 6 is a schematic diagram showing the construction of the fuel cell power generating system according to the sixth embodiment of the present invention.

The six embodiment of the present invention is shown in FIG. 6. The fuel cell power generating system has such a construction as the fuel supplying device 11 and the fuel cell 12 can be separated. A joint 8 is provided on a piping 7 which connects the fuel supplying device 11 and the fuel cell 12. Disconnecting the joint 8 separates the fuel supplying device 11 and the fuel cell 12, and connecting the joint 8 completes the piping 7 in continuity to allow the butane gas to flow. Because the separate construction makes it possible to make the fuel supplying 11 and the fuel cell 12 relatively small in size and light in weight, it is made easier to carry. This construction is particularly preferable in case a plurality of the butane gas pressure canisters 1 are provided or the fuel tank 9 is provided. Further, as the temperature of a part of the reforming device 4 may increase as high as 500° C., it may be thermally isolated from the butane gas pressure canister 1 or the fuel tank 9, or may be utilized as a heat source as described later.

Figure 7:
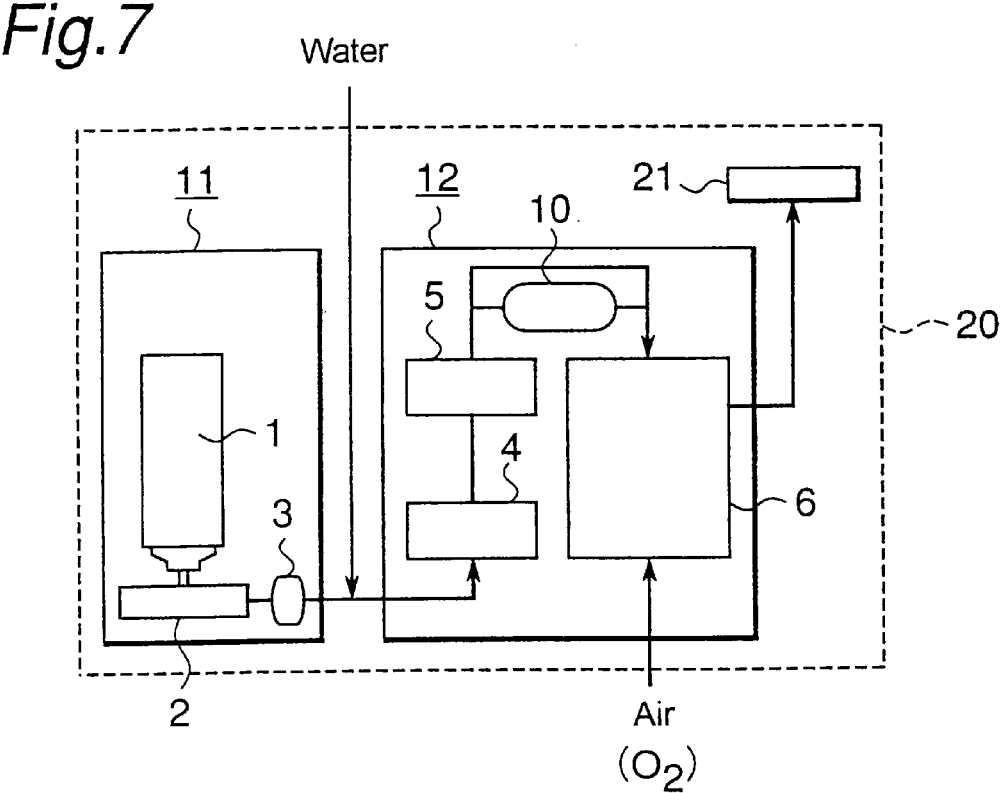
FIG. 7 is a schematic diagram showing the construction of the fuel cell power generating system according to the seventh embodiment of the present invention.

The seventh embodiment of the present invention is shown in FIG. 7. FIG. 7 is a schematic diagram showing the construction of the fuel cell power generating system according to the seventh embodiment of the present invention. The fuel cell power generating system has a flow path, that passes a hydrogen reservoir 10 which stores hydrogen in a minimum volume possible, installed between the CO eliminator 5 and the fuel cell 6. The hydrogen reservoir 10 may be, for example, a hydrogen storage alloy tank or a hydrogen pressure canister. With hydrogen stored in the hydrogen reservoir 10 in advance by means of an auxiliary drive such as a pump, hydrogen stored in the hydrogen reservoir 10 immediately after starting the fuel cell power generating system is supplied to the reformed gas which has passed the CO eliminator 5, and therefore generation of electric power can be started immediately. Further, because the load on the reforming device 4 is reduced, operation of the reforming device 4 can be stabilized. During the operation, the reformed gas which has passed the CO eliminator 5 is immediately introduced into the fuel cell 6. Hydrogen included in the reformed gas may also be stored during operation, and used at the start of the next operation.

Figure 8:
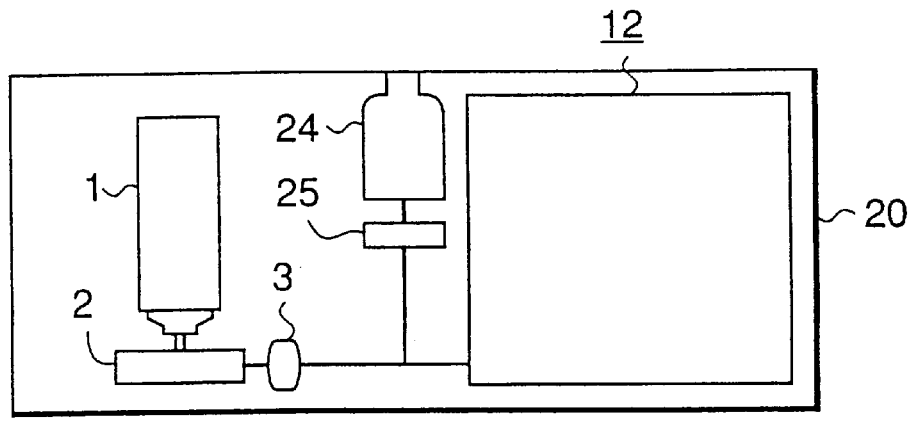
FIG. 8 is a schematic diagram showing the construction of the fuel cell power generating system according to another embodiment of the present invention.
Figure 9:
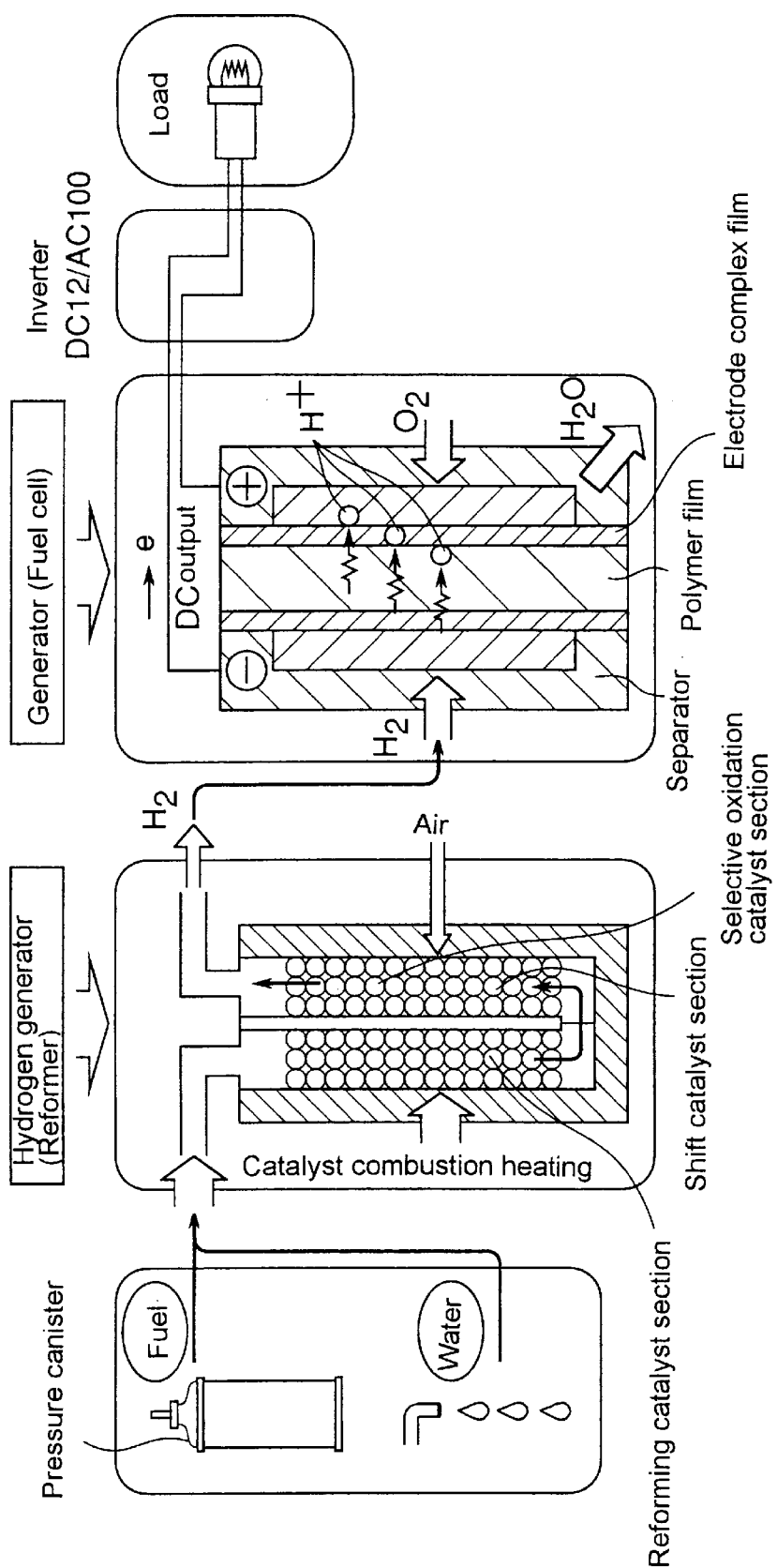
FIG. 9 is a diagram showing the operating principle of the power generation system of the present invention.
Figure 10:
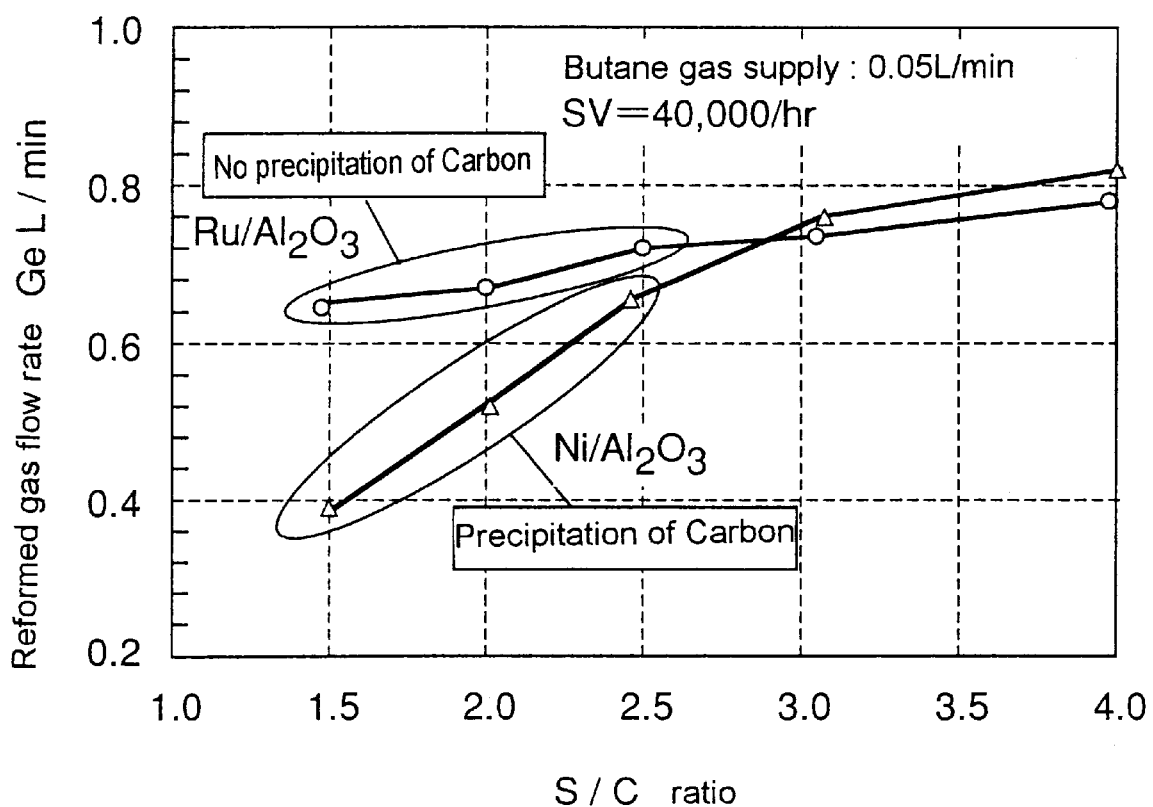
FIG. 10 is a graph showing the change in reformed gas ratio with different values of S/C during reforming of the butane gas.
Figure 11:
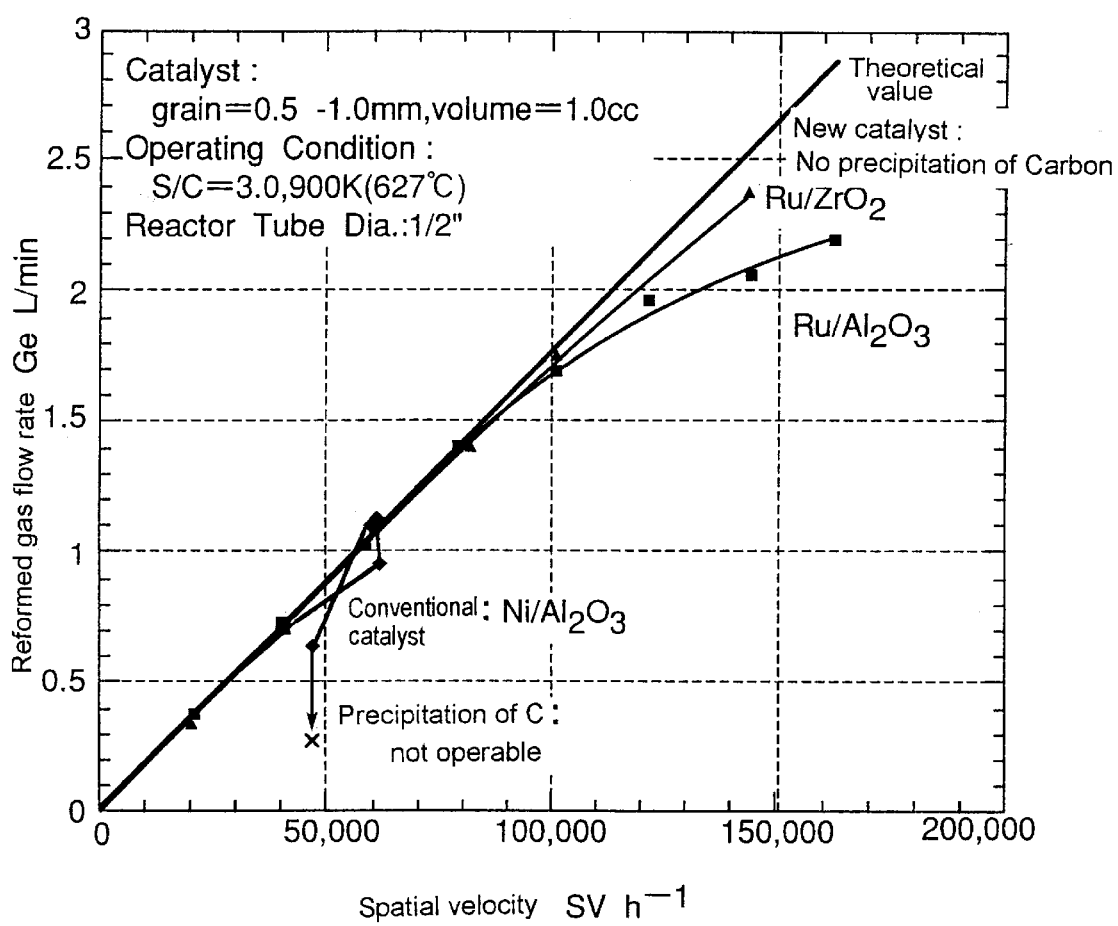
FIG. 11 is a graph showing the change in the amount of the reformed gas with different values of space velocity indicating the performance of ruthenium reforming catalyst.
Figure 12:
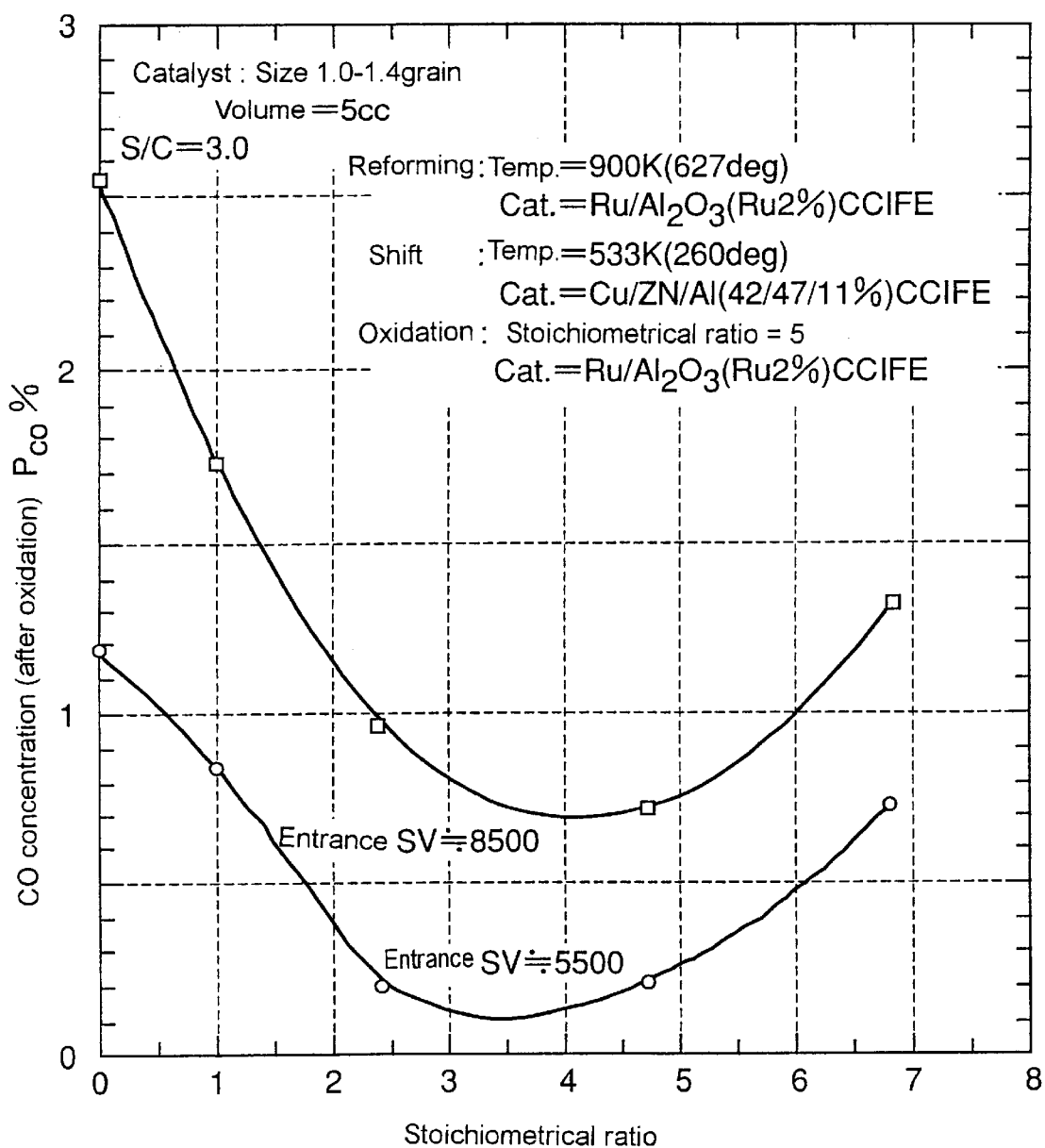
FIG. 12 is a graph showing the CO concentration after oxidation with different values of stoichiometrical ratio indicating the performance of CO oxidation.

In the fuel cell power generating system of the present invention, although no particular device and method for supplying water for reaction with the butane gas are specified, for example, a water reservoir tank 24 and a filter 25 for filtering water introduced from the tank 24 may be installed in the casing 20, as shown in FIG. 8. The filter 25 may be an ion exchanger, hollow paper filter or active carbon.

Figure 13:
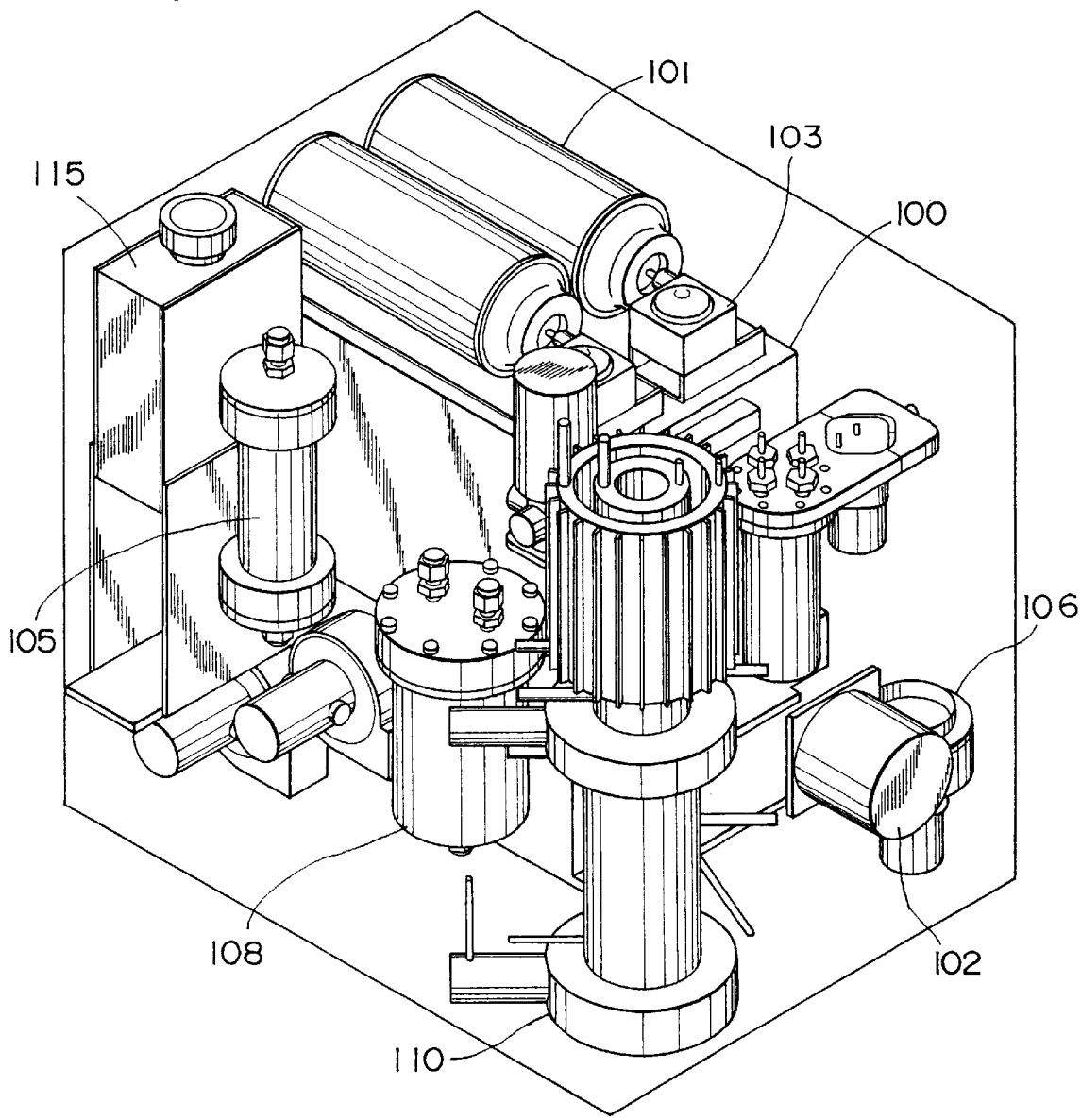
FIG. 13 is a schematic diagram showing the layout of the power generation system according to the present invention.
Figure 14:
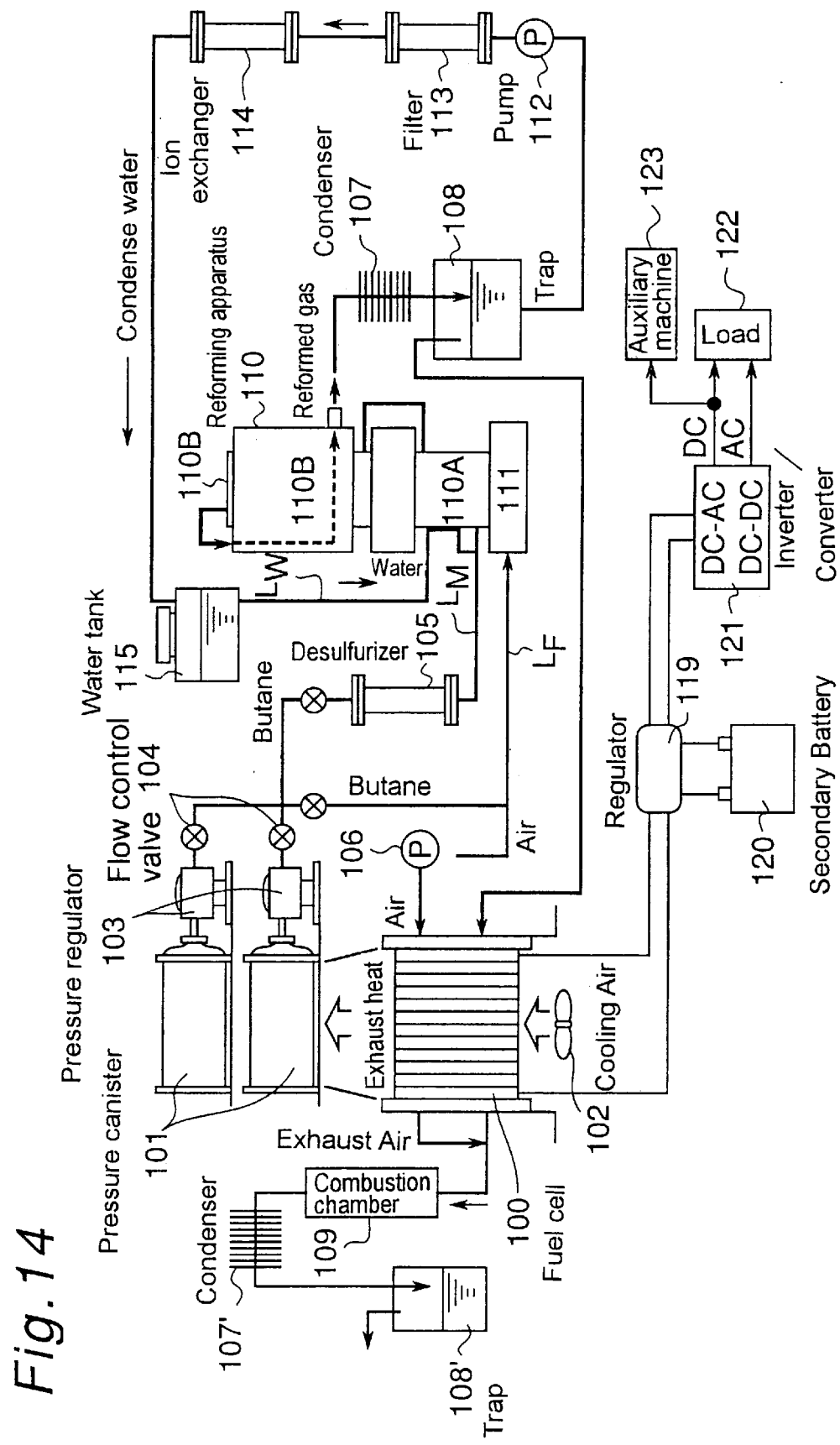
FIG. 14 is a flow diagram showing the most preferred embodiment of the present invention.
Figure 15A:
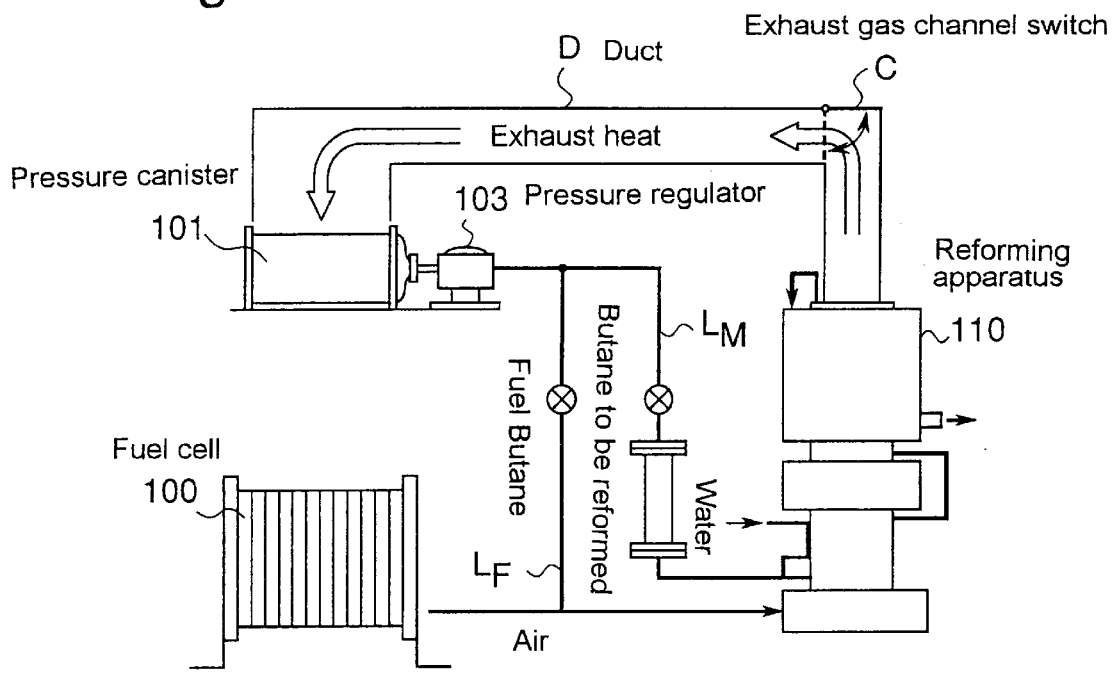
FIGS. 15A and 15B are schematic diagrams showing two methods A and B for heating the cassette pressure canister.
Figure 15B:
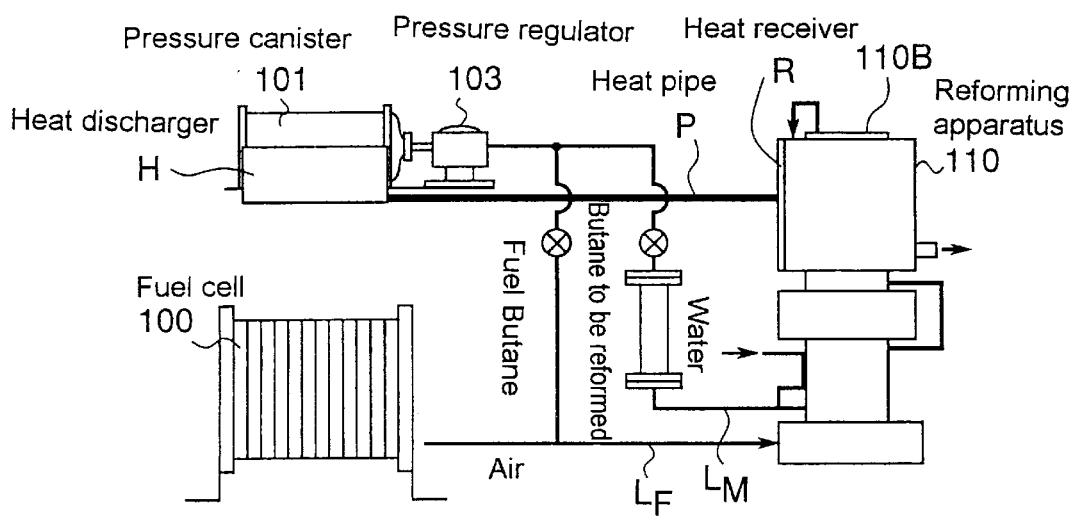

FIG. 13 is a schematic diagram showing the outline of the portable power generating system according to the present invention, and FIG. 14 is a system flow diagram thereof. In the drawing, numeral 101 denotes a portable butane gas pressure canister specified in JIS-S-2148, for example, two units thereof are mounted detachably in horizontal position on the fuel cell 100, and are temperature-controlled in a range from 20 to 40° C. by means of cooling air, introduced by a fan 102 installed on a side wall, which has passed through the fuel cell and removed the waste heat of the fuel cell. Methods shown in FIG. 15A, B may be employed for utilizing waste heat of the reforming device 110. FIG. 15A shows such a construction as exhaust gas from the reforming device 110 is sent to a gas pressure canister 101 through a duct D and a flow control plate C is installed for temperature control. FIG. 15B shows such a construction as a heat absorber R is installed on a side wall of the reforming device 110 and heat is transferred through a heat pipe P to a heat sink H which heats the gas pressure canister 101.

Figure 16:
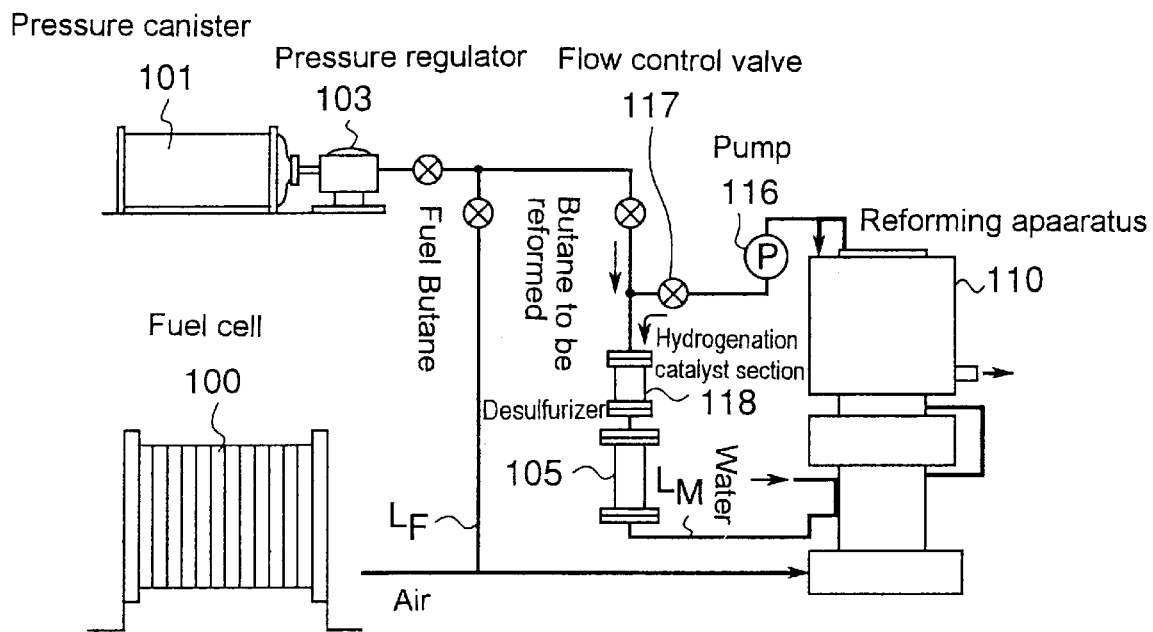
FIG. 16 is a schematic diagram showing an alternative method for desulfurizing the butane gas to be reformed.

As shown in FIG. 14, the butane gas discharged from the pressure canister 101 is sent to the reforming device 110 via a pressure regulator 103 and a flow control valve 104. The butane gas is normally divided into the butane gas for combustion and reforming the butane gas and supplied to the reforming device 110. The butane gas for combustion passes through a feed line $L_F$ and is fed together with combustion air to a combustion chamber 111 of the reforming device 110 to be burned by a burner or catalyst therein. Reforming the butane gas passes through a feed line $L_M$ and is sent to the reforming device 110 via a desulfurizer 105 (made of ZnO or Cu/Zn alloy). A hydrogenation catalyst section 118 (made of Ni—Mo or Co—Mo alloy) may also be installed in the flow path of the reformed butane gas, thereby to introduce a part of the reformed gas from the shift catalyst section 110B, as shown in FIG. 16. In this embodiment, the butane gas is pressurized by a pressurizing pump 116 and, after the flow rate is controlled by a flow control valve 117, introduced into the flow path of the reformed butane gas. Hydrogen included in the reformed gas and sulfur in the butane gas react to form hydrogen sulfide in the hydrogenation catalyst section 118 and is adsorbed in the desulfurizer 105. The reforming device 110 receives water supplied thereto via a feed line Lw for the purpose of steam reforming. Because water is mixed with the butane gas in the form of steam, water passes on the side wall of the reforming device 110 to be heated thereby before being supplied to the reforming device 110.

The reforming device 110 comprises a reforming catalyst section 110A where reforming reaction takes place, a shift catalyst section 110B where shift reaction takes place and a selective oxidation catalyst section 110C where CO is oxidized, each constituting a reaction chamber of which temperature can be controlled independently. The reforming catalyst section 110A is directly heated by the combustion chamber 111. The shift catalyst section 110B is located above the reforming catalyst section 110A and is heated indirectly by heat transferred from below. The selective oxidation catalyst section 110C is formed to surround the shift catalyst section 110B and is heated indirectly by exhaust combustion gas from the shift catalyst section 110B.

The reformed gas from the reforming device 110 includes water vapor. Water vapor is condensed in a condenser 107 and is recovered in a trap 108, while the reformed gas is sent to the fuel cell 100. Recovered water is sent to a water tank 115 by a liquid transfer pump 112 for recycling, and is processed by the filter 113 and the ion exchange resin 114 to be used repeatedly over a long period of time.

The fuel cell 100 is supplied with air by an air pump 106, to generate electric power by using hydrogen in the reformed gas and oxygen in the air. The reformed gas which is discharged after being used in the fuel cell 100 includes hydrogen remaining therein, which is burned by using air which is also discharged after use in the fuel cell 100.

The reformed gas and air which have been discharged from the fuel cell after use are burned in the combustion chamber 109, with water content recovered in a trap 108' after passing a condenser 107', processed by the filter 113 and the ion exchange resin 114 and is sent to the water tank 115, as in the case of the water content described previously.

As the electric power output from the fuel cell fluctuates depending on the load, an inverter/converter 121 is used to obtain constant direct current or alternating current output, while a secondary battery 120 is installed in this electric circuit via a regulator 119. This construction makes it possible to start an auxiliary machine 123 by supplying electric power thereto from the secondary battery 120 when power is not supplied from the fuel cell 100 at the time of startup. During operation, part of electric power generated by the fuel cell 100 may be stored in the secondary battery 120, in order to stabilize the power supply to the load by supplying power from the secondary battery 120 when an abrupt load 122 variation resulted in shortage of power supply from the fuel cell 100.

When the fuel cell power generating system is provided with two or more butane gas pressure canisters, such a case may arise that the same amounts of the butane gas are discharged from all pressure canisters to the reforming device 110 and the pressure canisters are emptied at the same time. To prevent this from taking place, a flow path regulator is installed in the butane gas flow lines from the pressure canisters, thereby to differentiate the flow rates of the butane gas from the pressure canisters and change the consumption of the butane gas in the pressure canisters, This construction makes it possible to always keep stock of the butane gas in either of the pressure canisters, thereby ensuring continuous operation of the fuel cell.

What is claimed is:

1. A portable power generating system comprising:
   a portable pressure canister containing butane fuel gas;
   a reforming device for preparing reformed gas containing hydrogen gas by using a portion of the butane gas contained in said pressure canister as a fuel gas and another portion of the butane gas to be reacted with water;
   a fuel cell for generating electric power by using the hydrogen gas in the reformed gas and oxygen gas in air;
   a device for regulating an amount of the butane gas discharged from said pressure canister; and
   a device for controlling a flow rate of the butane gas, installed in feed lines for supplying the butane gas from said pressure canister to said reforming device,
   wherein said device for controlling the amount of the butane gas discharged from said butane gas pressure canister comprises a heater capable of heating the pressure canister comprising an electric heater, a heater operable by waste heat from said fuel cell or a heater operable by waste heat from said reforming device.

2. The power generating system according to claim 1, wherein a feed line for supplying butane gas to be reformed and a feed line for supplying said reforming device with the butane gas as fuel are provided in a flow path between said pressure canister and a reforming device.

3. The power generating system according to claim 1, wherein two or more butane gas pressure canisters are provided for continuous operation, with said pressure canisters being switched and connected with a respective gas feed line in turn.

4. The power generating system according to claim 1, wherein said device for controlling the butane gas flow comprises a pressure regulator and a flow control valve.

5. The power generating system according to claim 1 wherein a desulfurizer is provided in the feed line for supplying the butane gas to be reformed.

6. The power generating system according to claim 5, wherein said desulfurizer has a hydrogenation catalyst section where hydrogen is added to the butane gas to be reformed.

7. The power generating system according to claim 1, wherein said reforming device is an integrated system which comprises a reforming reaction section, a shift reaction section and a CO oxidation section which are independent from each other.

8. The power generating system according to claim 7, wherein the reforming reaction section is operated under conditions of a temperature of not less than 600° C. and a S/C value of not less than 2.5.

9. The power generating system according to claim 7, wherein the reforming reaction section contains $Ru/Al_2O_3$ catalyst.

10. The power generating system according to claim 7, wherein said CO oxidation section is operated with a stoichiometrical ratio (ratio of a theoretical amount of air for oxidizing CO in a reformed gas to an amount of air used) in a range from 3 to 10.

11. The power generating system according to claim 7, wherein said CO oxidation section contains a $Ru/Al_2O_3$ catalyst and is operated at a temperature from 120 to 180° C.

12. The power generating system according to claim 1, which further comprises a recycling system wherein water in the reformed gas from said reforming device, in the waste gas discharged from said fuel cell and in the exhaust air and/or in the combustion gas are collected and used as reforming water.

13. The power generating system according to claim 12, which further comprises a filter for filtering the recycled water, an ion exchanger for purifying the recycled water and a water tank for storing the recycled water.

14. The power generating system according to claim 1, which comprises an electric circuit for outputting electric power of the fuel cell via an inverter and a converter without fluctuation due to the load.

15. The power generating system according to claim 1, which further comprises a secondary battery to be connected to said electric circuit via a regulator.

16. The power generating system according to claim 1, wherein said fuel cell is of a solid polymer type having a fuel electrode to which hydrogen in the reformed gas is introduced through a solid polymer membrane and an oxygen electrode to which oxygen in the air is introduced.

17. The power generating system according to claim 1, wherein said fuel cell is of a solid polymer type.

18. The power generating system according to claim 1, said reforming device is an integrated system which comprises a reforming reaction section, a shift reaction section and a CO oxidation section which are independent from each other, said reforming reaction section containing $Ru/Al_2O_3$ catalyst, said shift reaction section containing Cu—Zn based catalyst and said CO oxidation section containing $Ru/Al_2O_3$ catalyst.

19. The power generating system according to claim 18, wherein said reforming reaction section is operated under conditions of a temperature of not less than 600° C. and a S/C value of not less than 2.5; said shift reaction section is operated at a temperature of about 200 to 270° C.; and said CO oxidation section is operated under condition of a stoichiometrical ratio of a theoretical amount of air for oxidizing CO in a reformed gas to an amount of air used in a range from 3 to 10 at a temperature from 120 to 180° C. while said fuel cell comprises a solid polymer type fuel cell operated by using a fuel gas containing a low CO content.

* * * * *

UNITED STATES PATENT AND TRADEMARK OFFICE
CERTIFICATE OF CORRECTION

PATENT NO. : 6,183,895 B1
DATED : February 6, 2001
INVENTOR(S) : H. Kudo et al.

It is certified that error appears in the above-identified patent and that said Letters Patent is hereby corrected as shown below:

<u>Column 10,</u>
Line 52, "a" should be -- said --.

Signed and Sealed this

Twenty-eighth Day of May, 2002

Attest:

JAMES E. ROGAN
*Attesting Officer*   *Director of the United States Patent and Trademark Office*